(12) United States Patent
Maekawa

(10) Patent No.: US 6,351,723 B1
(45) Date of Patent: Feb. 26, 2002

(54) FAILURE DIAGNOSTIC METHOD AND APPARATUS FOR EQUIPMENT AND RECORDING MEDIUM IN WHICH PROGRAM CAUSING COMPUTER SYSTEM TO EXECUTE PROCESS IN ACCORDANCE WITH SUCH METHOD IS STORED

(75) Inventor: Kazuhiro Maekawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/066,334

(22) PCT Filed: Aug. 28, 1997

(86) PCT No.: PCT/JP97/03012

§ 371 Date: Apr. 29, 1998

§ 102(e) Date: Apr. 29, 1998

(87) PCT Pub. No.: WO98/09206

PCT Pub. Date: Mar. 5, 1998

(30) Foreign Application Priority Data

Aug. 29, 1996 (JP) .............................................. 8-228999

(51) Int. Cl.[7] .......................... G06F 11/30; G06F 15/00; G21C 17/00
(52) U.S. Cl. ........................................ 702/185; 702/179
(58) Field of Search ........................ 702/33–36, 56–59, 702/113–116, 125, 179–185, 187, FOR 103, 104, 123, 124–126, 135, 137; 714/745, 721; 700/108–110, 119–121, 174–177, 275, 280; 438/10, 17

(56) References Cited

U.S. PATENT DOCUMENTS

| | | | |
|---|---|---|---|
| 4,592,085 A | 5/1986 | Watari et al. | 704/238 |
| 5,225,998 A | 7/1993 | Singhal | 702/84 |
| 5,514,978 A * | 5/1996 | Koegl et al. | 324/772 |
| 5,642,296 A * | 6/1997 | Saxena | 702/84 |
| 5,715,181 A * | 2/1998 | Horst | 702/180 |
| 5,754,450 A * | 5/1998 | Solomon et al. | 702/35 |
| 5,760,693 A * | 6/1998 | Chae | 340/588 |
| 5,913,102 A * | 6/1999 | Yang | 438/14 |
| 5,956,251 A * | 9/1999 | Atkinson et al. | 700/109 |

FOREIGN PATENT DOCUMENTS

| | | |
|---|---|---|
| JP | 4-204117 | 7/1992 |
| JP | 8-87323 | 4/1995 |
| JP | 7-180907 | 7/1995 |
| JP | 7-261832 | 10/1995 |
| KR | 84-3871 | 10/1984 |
| KR | 91-17314 | 11/1991 |

OTHER PUBLICATIONS

Devor et al. Statistical Quality Design and Control: Contemporary Concepts and Methods. 1992. pp. 255, 265–267.*

* cited by examiner

Primary Examiner—Marc S. Hoff
Assistant Examiner—Manuel L. Barbee
(74) Attorney, Agent, or Firm—Staas & Halsey LLP

(57) ABSTRACT

The present invention regards to a failure diagnostic method and apparatus for diagnosing a failure of equipment based on an operating state of the equipment. In the present invention, operating parameters which represent the operating state of the equipment are obtained in time series, a predetermined number of operating state parameters are selected from the obtained operating state parameters, a value of a deviation process capability is calculated from the predetermined number of operating state parameters every time the predetermined number of operating state parameters are selected, and the state regarding the failure of the equipment is determined based on the value of the deviation process capability.

25 Claims, 13 Drawing Sheets

FAILURE DIAGNOSTIC METHOD AND APPARATUS FOR EQUIPMENT AND RECORDING MEDIUM IN WHICH PROGRAM CAUSING COMPUTER SYSTEM TO EXECUTE PROCESS IN ACCORDANCE WITH SUCH METHOD IS STORED

FIELD OF THE INVENTION

The present invention relates to a failure diagnostic method and apparatus for equipment, and more particularly to a failure diagnostic method and apparatus for carrying out a failure diagnosis for equipment based on an operating state of the equipment. In addition, the present invention relates to a recording medium in which a program causing a computer system to execute a process in accordance with the method is stored.

For example, as to manufacturing equipment, it is required for the equipment to be stably operated. Thus, it is necessary to watch an operating state of the equipment. Due to watching the operating state of the equipment, a failure of the equipment is detected and a state where the equipment has failed is rapidly detected, so that the stable operation of the equipment can be realized. As a result, products having even quality can be manufactured.

BACKGROUND OF THE INVENTION

In a conventional watching process for watching the state of the equipment, a detected parameter value of the state of the equipment is compared with a threshold of an alarm point or a fault point. When the detected parameter value exceeds such a threshold, it is diagnosed that the equipment is becoming a failure state or that the equipment has failed.

For example, as to a mass flow controller which is a gas flow control device of semiconductor manufacturing equipment, Japanese Laid Open Patent Application No. 4-350705 discloses that an alarm issuance level is automatically changed when a set level is changed by a valve voltage comparing circuit of the mass flow controller and that a valve voltage corrected based on a flow rate of gas, a pressure and a temperature is compared with a reference valve voltage so that a failure is prevented.

In an actual mass flow controller, as shown by a solid line I in FIG. 6, for example, supposing a normal gas flow, a value of 14SLM (Standard Liter per Minute) is set as the gas flow rate (a set voltage V1). In the middle of a process, supposing a case where the valve voltage increases due to a failure of the mass flow controller, the set value of gas flow rate is changed to 13.5SLM (a set voltage V2). That is, the case where the gas flow rate is set at 14SLM by the set voltage V1 is a normal state and the case where the gas flow rate is set at 13.5SLM by the set voltage V2 is an abnormal state. Since a variation range of the valve voltage in the normal state overlaps with a variation range of the valve voltage in the abnormal state, it is difficult to determine whether the valve voltage varying as shown by a solid line II is normal or abnormal.

In a case shown in FIG. 6, when the gas flow rate is set at 14SLM, the average of the valve voltage is equal to −2.66 volts and the standard deviation thereof is equal to 0.063. When the gas flow rate is set at 13.5SLM, the average of the valve voltage is equal to −2.62 volts and the standard deviation thereof is equal to 0.067.

SUMMARY OF THE INVENTION

A general object of the present invention is to provide novel and useful failure diagnostic method and apparatus for equipment in which the disadvantages of the aforementioned prior art are eliminated and a recording medium in which a program causing a computer system to execute a process in accordance with the method is stored.

A specific object of the present invention is to provide a failure diagnostic method and apparatus which can accurately detects a state where the equipment has failed or a state where the equipment is becoming failure.

The above objects of the present invention are achieved by a failure diagnostic method for diagnosing a failure of equipment based on an operating state of the equipment, the method comprising steps of: obtaining operating state parameters, in time series, which represent the operating state of the equipment; selecting a predetermined number of operating state parameters from among the obtained operating state parameters; calculating a value of a deviation process capability from the predetermined number of operating state parameters every time the predetermined number of operating state parameters are selected; and determining a state regarding a failure of the equipment based on the value of the deviation process capability.

According to such a failure diagnostic method, every time the predetermined number of operating state parameters are selected from among the operating state parameters which have been obtained in time series, the determination regarding the failure of the equipment is carried out based on the value of the deviation process capability calculated from the predetermined number of operating state parameters.

That is, the variation of the predetermined number of operating state parameters is numerically represented using the value of the deviation process capability. Even if the range of the variation in the normal state overlaps with the range of that in the abnormal state, since the variation is numerically represented, the degree of failure of the equipment (normal, becoming failure and has failed) can be represented. Thus, the state where the equipment has failed or is becoming failure can be accurately determined from the operating state of the equipment.

In addition, since the value of the deviation process capability is calculated every time the predetermined number of operating state parameters are selected from among the operating state parameters which have been obtained in time series, the state of the equipment in a period in which the predetermined number of operating state parameters were obtained is determined.

The operating state parameter representing the operating state of the equipment includes various kinds of control parameters for controlling the equipment (a set voltage used to set a gas flow rate in a gas flow controller) and detected values, such as the temperature and the driving speed.

To grasp the time variation of the state regarding the failure of the equipment, in the above failure diagnostic method according to the present invention, the predetermined number of operating state parameters which are successive in time series may be shifted on a time scale and selected from among the obtained operating state parameters.

According to such a failure diagnostic method, since the predetermined number of operating parameters which are successive in time series are shifted on the time scale and selected, the time variation of the value of the deviation process capability which is calculated every time the predetermined number of operating state parameters are selected corresponds to the time variation of state of the equipment.

In addition, to grasp the time variation of the state of the equipment at a real time (every time the operating state parameters are actually obtained), in the present invention, every time an operating state parameter of the equipment is obtained, the latest predetermined number of operating state parameters including the obtained operating state parameter may be selected.

According to such a failure diagnostic method, the operating state parameters are shifted by an interval at which the operating state parameter is obtained so that the latest predetermined number of operating state parameters are selected.

The above objects of the present invention are achieved by a failure diagnostic apparatus for diagnosing a failure of equipment based on an operating state of the equipment, comprising: parameter obtaining means for obtaining operating state parameters, in time series, which represent the operating state of the equipment; parameter selecting means for selecting a predetermined number of operating state parameters from among the obtained operating state parameters; calculating means for calculating a value of a deviation process capability from the predetermined number of operating state parameters every time the predetermined number of operating state parameters are selected; determining means for determining a state regarding a failure of the equipment based on the value of the deviation process capability; and output means for outputting information based on a determination result obtained by the determining means.

In such a failure diagnostic apparatus, every time the predetermined number of operating state parameters are selected from among the operating state parameters which are obtained in time series, the determination of the state of the equipment is performed based on the value of the deviation process capability calculated from the predetermined number of operating state parameters. The information based on the determination result is output by the output means.

A user of such a failure diagnostic apparatus can grasp the state of the equipment from the output information.

Further, the above objects of the present invention are achieved by a failure diagnostic apparatus for diagnosing a failure of equipment based on an operating state of the equipment, comprising: parameter obtaining means for obtaining operating state parameters, in time series, which represent the operating state of the equipment; parameter selecting means for selecting a predetermined number of operating state parameters from among the obtained operating state parameters; calculating means for calculating a value of a deviation process capability from the predetermined number of operating state parameters every time the predetermined number of operating state parameters are selected; means for generating information regarding a failure state of the equipment based on the value of the deviation process capability calculated by the calculating means; and output means for outputting the generated information regarding the failure state of the equipment.

In such a failure diagnostic apparatus, every time the predetermined number of operating state parameters are selected from the operating state parameters which are obtained in time series, the information regarding the failure state of the equipment is generated based on the value of the deviation process capability calculated from the predetermined number of operating state parameters. The generated information is then output by the output means.

A user of such a failure diagnostic apparatus determines the state regarding the failure of the equipment (normal, becoming failure or have failed).

Further, to provide a recording medium in which a program causing a computer to execute a process for failure diagnostic of equipment based on an operating state of the equipment is stored, in the preset invention, the program stored in the medium comprises a parameter obtaining step for obtaining operating state parameters, in time series, which represent the operating state of the equipment; a parameter selecting step for selecting a predetermined number of operating state parameters from among the obtained operating state parameters; a calculating step for calculating a value of a deviation process capability from the predetermined number of operating state parameters every time the predetermined number of operating state parameters are selected; and a determining step for determining a state regarding a failure of the equipment based on the value of the deviation process capability.

From the same viewpoint, a recording medium storing a program causing a computer to execute a process for diagnosing a failure of equipment based on an operating state of the equipment comprises: a parameter obtaining step for obtaining operating state parameters, in time series, which represent the operating sate of the equipment; a parameter selecting step for selecting a predetermined number of operating state parameters from among the obtained operating state parameters; a calculating step for calculating a value of a deviation process capability from the predetermined number of operating state parameters every time the predetermined number of operating state parameters are selected; and a step for generating information regarding a failure state of the equipment based on the value of the deviation process capability.

BRIEF DESCRIPTION OF THE DRAWINGS

Other objects, features and advantages of the present invention will be apparent from the following description when read in conjunction with the accompanying drawings, in which.

DESCRIPTION OF THE PREFERRED EMBODIMENTS

A description will be given of examples of the present invention using the drawings.

Figure 1:
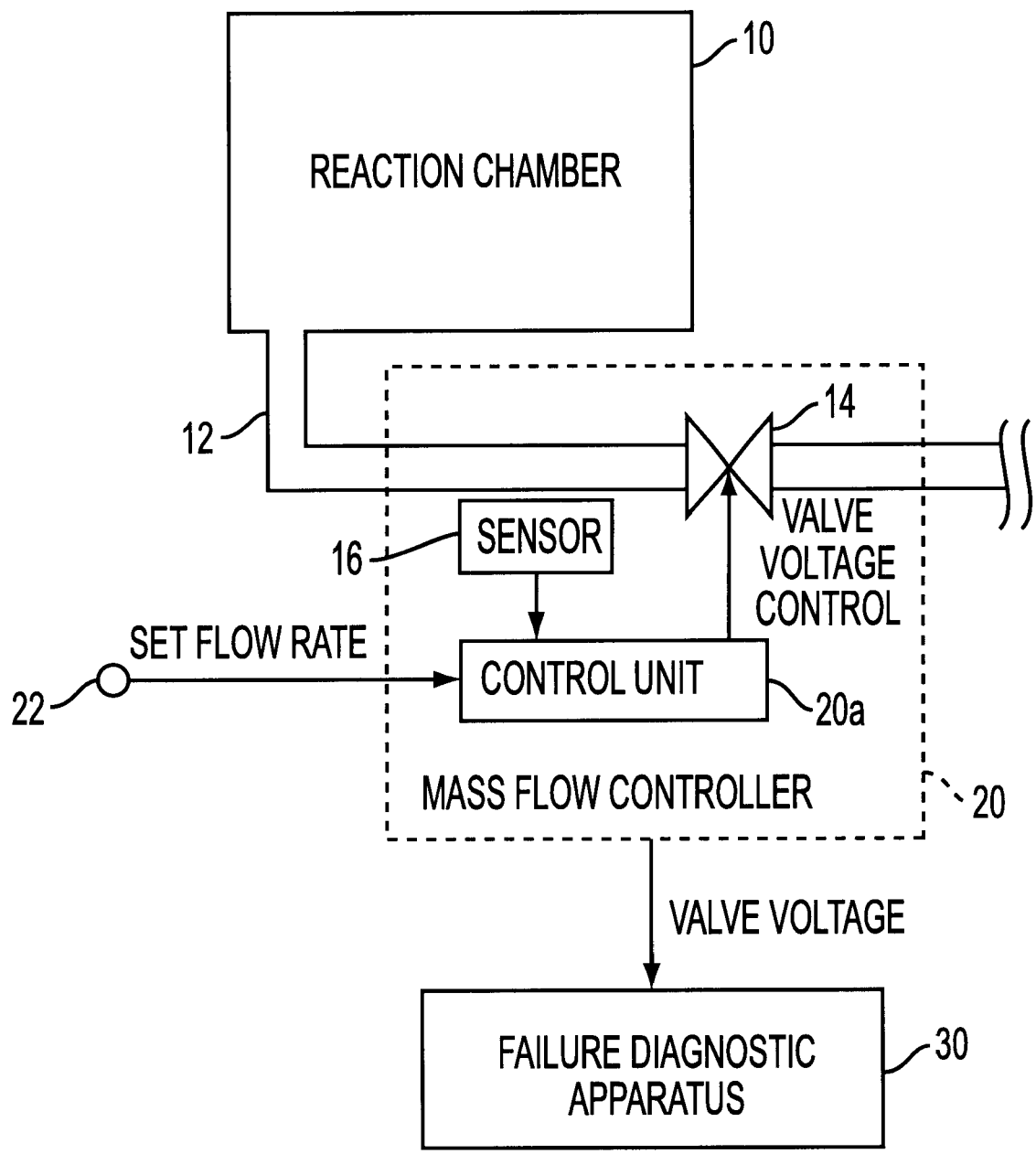
FIG. 1 is a block diagram illustrating an example of the constitution of a failure diagnostic apparatus for equipment according to an embodiment of the present invention and a mass flow controller (a semiconductor manufacturing apparatus) to which the failure diagnostic apparatus is.

FIG. 1 shows an example of the constitution in case where a failure diagnostic apparatus for equipment according to an embodiment of the present invention is applied to a mass flow controller which is a semiconductor manufacturing apparatus.

Referring to FIG. 1, a reaction chamber 10 of a CVD (Chemical Vapor Deposition) apparatus is connected to a mass flow controller 20 through a pipe 12. In the reaction chamber 10, semiconductor material to which the CVD process to be applied is set. The reaction chamber 10 is controlled at a predetermined temperature. The flow rate of CVD reacting gas supplied to the reaction chamber 10 through the pipe 12 is controlled at a constant value.

The mass flow controller 20 which is the semiconductor manufacturing apparatus has a valve 14 provided in the pipe 12, a flow sensor 16 and a control unit 20a. The control unit 20a is provided with a flow setting voltage, corresponding to the flow rate (the set flow rate) of the CVD reacting gas which is to be supplied to the reaction chamber 10, from a terminal 22. The control unit 20a supplies a valve voltage to the valve 14 so that the flow rate, detected by the flow sensor 16, of the CVD reacting gas passing through the pipe 12 is controlled at the above set flow rate. The opening of the valve is adjusted by the valve voltage. In addition, the valve voltage is supplied to a failure diagnostic apparatus 30.

Figure 2:
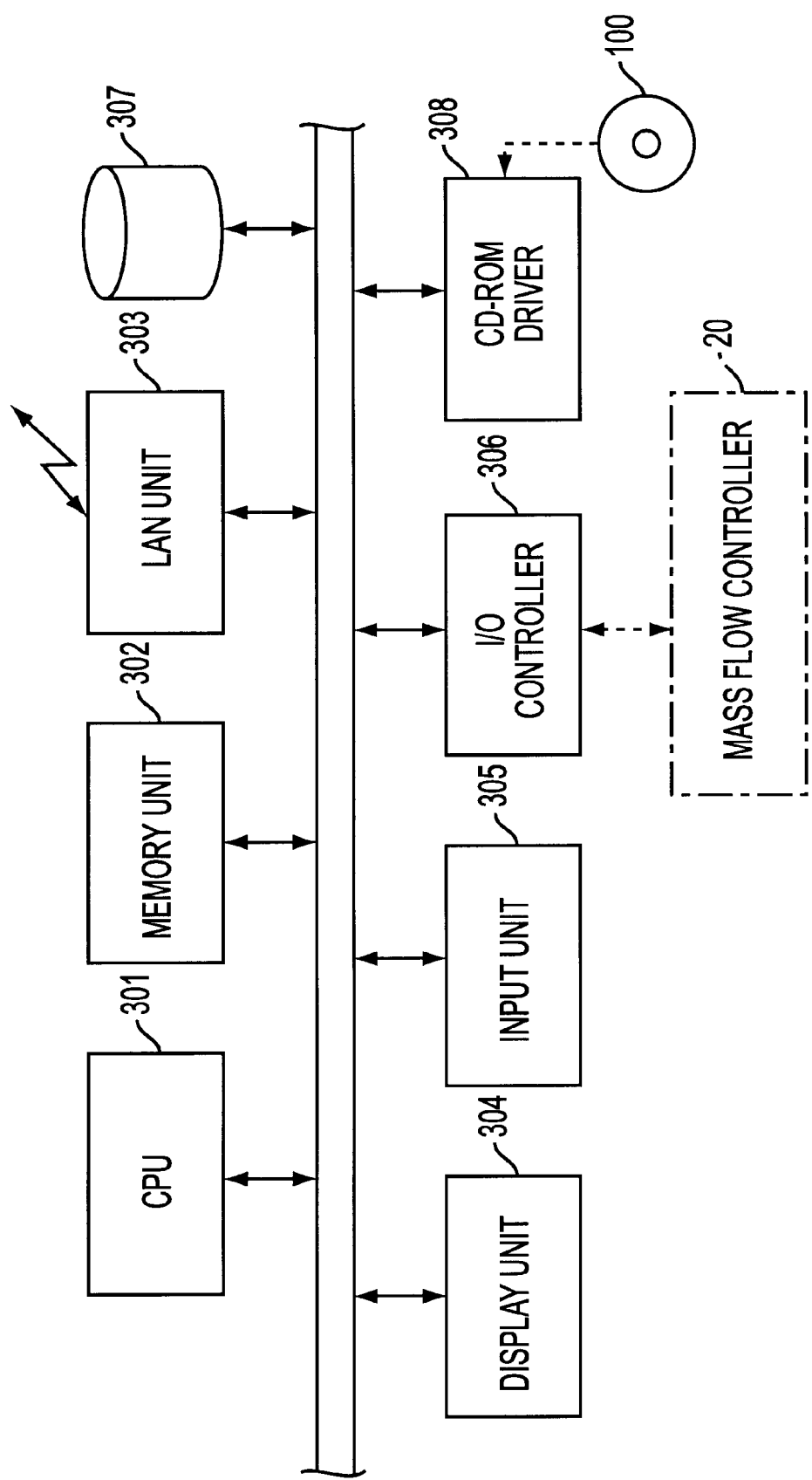
FIG. 2 is a block diagram illustrating an example of the constitution of hardware of the failure diagnostic apparatus shown in FIG. 1.

The failure diagnostic apparatus 30 is formed as shown in FIG. 2.

Referring to FIG. 2, the failure diagnostic apparatus 30 has a CPU (Central Processing Unit) 301 which controls the whole of the apparatus, a memory unit 302, a LAN unit 303, a display unit 304, an input unit 305, an interface unit 306, a disk unit 307 and a CD-ROM drive unit 308. The respective units are connected to each other via a bus. In addition, the interface unit 306 is connected to the mass flow controller 20 and provided with the valve voltage from the mass flow controller 20. The valve voltage is further supplied from the interface 306 to the CPU 301 via the bus.

The memory unit 302 has a ROM (Read Only Memory) and a RAM (Random Access Memory). Programs, such as a program regarding the failure diagnostic process, to be executed by the CPU 301 and data and tables needed for the processes in the CPU 301 are stored in the memory unit 302. The LAN unit 303 performs data communication with a host computer or a server via a LAN and transmits diagnostic information, regarding failures of the mass flow controller 20, obtained in the failure diagnostic process and analyzing information to the host computer or the server via the LAN. The display unit 304 displays the diagnostic information obtained In the failure diagnostic process and warning messages. The input unit 305 has a keyboard and a mouse and is used by user to input initial set data and specifying information. The disk unit 307 is provided with programs which are to be installed in the failure diagnostic apparatus 30 and files of diagnostic information obtained in the failure diagnostic process.

The program regarding the failure diagnostic process is supplied to the failure diagnostic apparatus 30, for example, using a CD-ROM 100. That is, when the CD-ROM 100 storing the program regarding the failure diagnostic process is set in the CD-ROM drive unit 308, the program read out of the CD-ROM 100 is installed from the CD-ROM drive unit 308 to the disk unit 307. When the failure diagnostic apparatus is activated, the program regarding the failure diagnostic process is read out of the disk unit 307 and set in the memory unit 302. The CPU 301 carries out the failure diagnostic process in accordance with the program, regarding the failure diagnostic process, stored in the memory unit 302.

Figure 3:
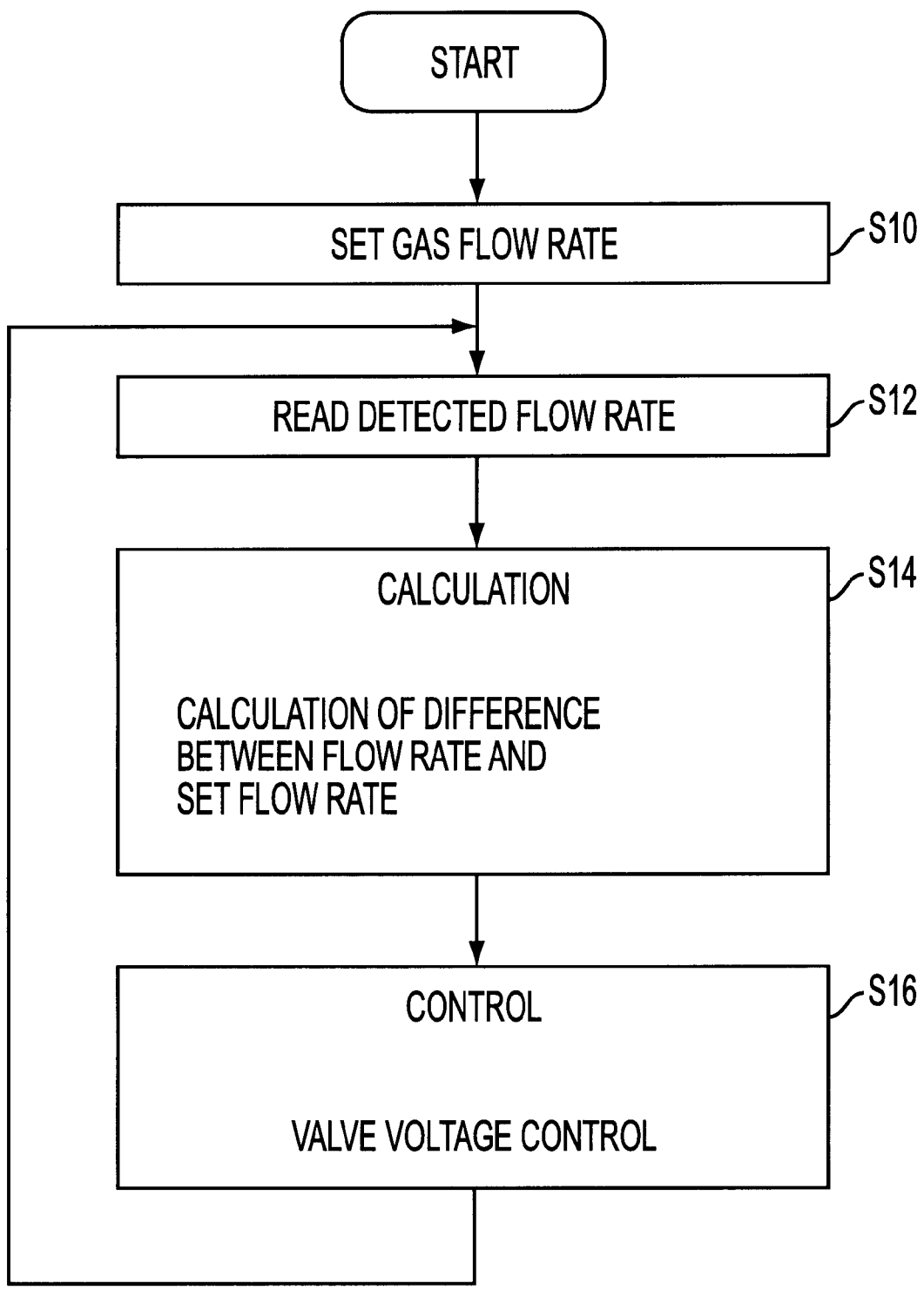
FIG. 3 is flowchart illustrating a procedure of a control operation of the mass flow controller shown in FIG. 1.

FIG. 3 shows a flowchart of a control operation executed by the mass flow controller 20. Referring to FIG. 3, in step S10, the gas flow rate is set (the set flow rate), so that the set voltage is decided. In step S12, the flow rate of the gas detected by the flow sensor 16 (the detected flow rate) is read. In step S14, the difference between the detected flow rate and the set flow rate is calculated. In step S16, the valve voltage which causes the detected flow rate to be equal to the set flow rate is found based on the above difference and the opening of the valve 14 is controlled.

A description will now be given of the failure diagnostic process executed in the failure diagnostic apparatus 30 applied to the mass flow controller 20 operating as described above.

In an SPC (Statistical Process Control) method, a Cp value (a value of a process capability) and a Cpk value (a value of a deviation process capability) may be used as a value representing the process capability. The Cp value and the Cpk value are respectively calculated by the following equations.

$$Cp = (\text{SPECIFICATION WIDTH})/(6 \times \text{STANDARD DEVIATION}) \quad (1)$$

$$Cpk = (1-K)(\text{SPECIFICATION WIDTH})/(6 \times \text{STANDARD DEVIATION}) \quad (2)$$

$$|K| = |\text{CENTER VALUE OF SPECIFICATION} - \text{AVERAGE}|/(\text{SPECIFICATION WIDTH}/2)$$

(6S×STANDARD DEVIATION) in the equation (1) includes 99.7% data items of all data items. In a case where Cp is equal to 1 (Cp=1), since most of the data items are in the specification width, it is thinkable that the proper process capability is obtained. In a case where Cp is equal to 1.3 (Cp=1.3), it is thinkable that the sufficient process capability is obtained. It is thinkable that the lower the Cp less than 1, more inferior the process capability. The Cpk value depends on the difference between the center value of the specification and the average in the data distribution and has the same meaning as the Cp value.

By only calculation of the Cpk value of voltages for mass flow controller 20 as equipment data, failures of the equipment, that is the mass flow controller 20, cannot be detected. This is based on the following reason. The equipment data is varied every moment and the large number of equipment data items are obtained with time elapsing. A range of variation of data in the abnormal state overlaps a range of variation of data in the normal state.

Thus, in the present invention, a group including predetermined number of data items is partitioned off from time series data items and the group is successively shifted. Every time the group is shifted, the Cpk value in the group including the predetermined number of data items is calculated (hereinafter, this Cpk value is referred to as a shifting Cpk value in proper cases). For example, in a case where the shifting value of a group including 20 data items partitioned off from a population including 1000 data items, the center value of the specification and the specification width are calculated from a population of normal equipment data items. The Cpk value is then calculated from 20 data items of each of the groups of data Nos. 1–20, 2–21, 3–22, . . . , 980–999 and 981–1000. Each Cpk value is compared with a reference value and it is determined whether or not the equipment is normal.

Figure 4:
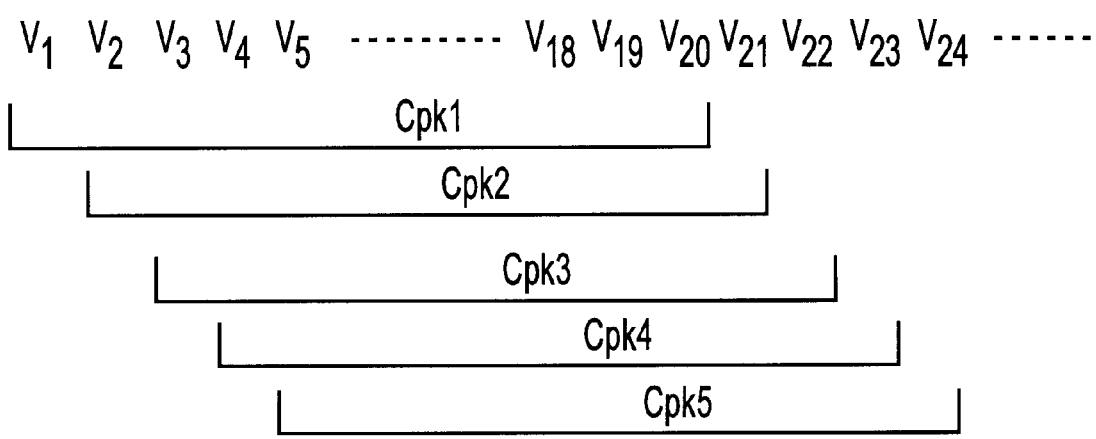
FIG. 4 is a diagram illustrating a relationship between a valve voltage sampled from the mass flow controller by the failure diagnostic apparatus and a value Cpk of a deviation process capability calculated from the valve voltage.

That is, in the embodiment, as shown in FIG. 4, from valve voltages V1, V2, . . . which has been sampled at predetermined intervals, a predetermined number (e.g. 20) of valve voltages sampled in series are selected and shifted by an interval (V1–V20, V2–V21, V3–V22, . . . ). The Cpk value (the shifting Cpk value) is calculated from the selected predetermined number of valve voltages.

Figure 5:
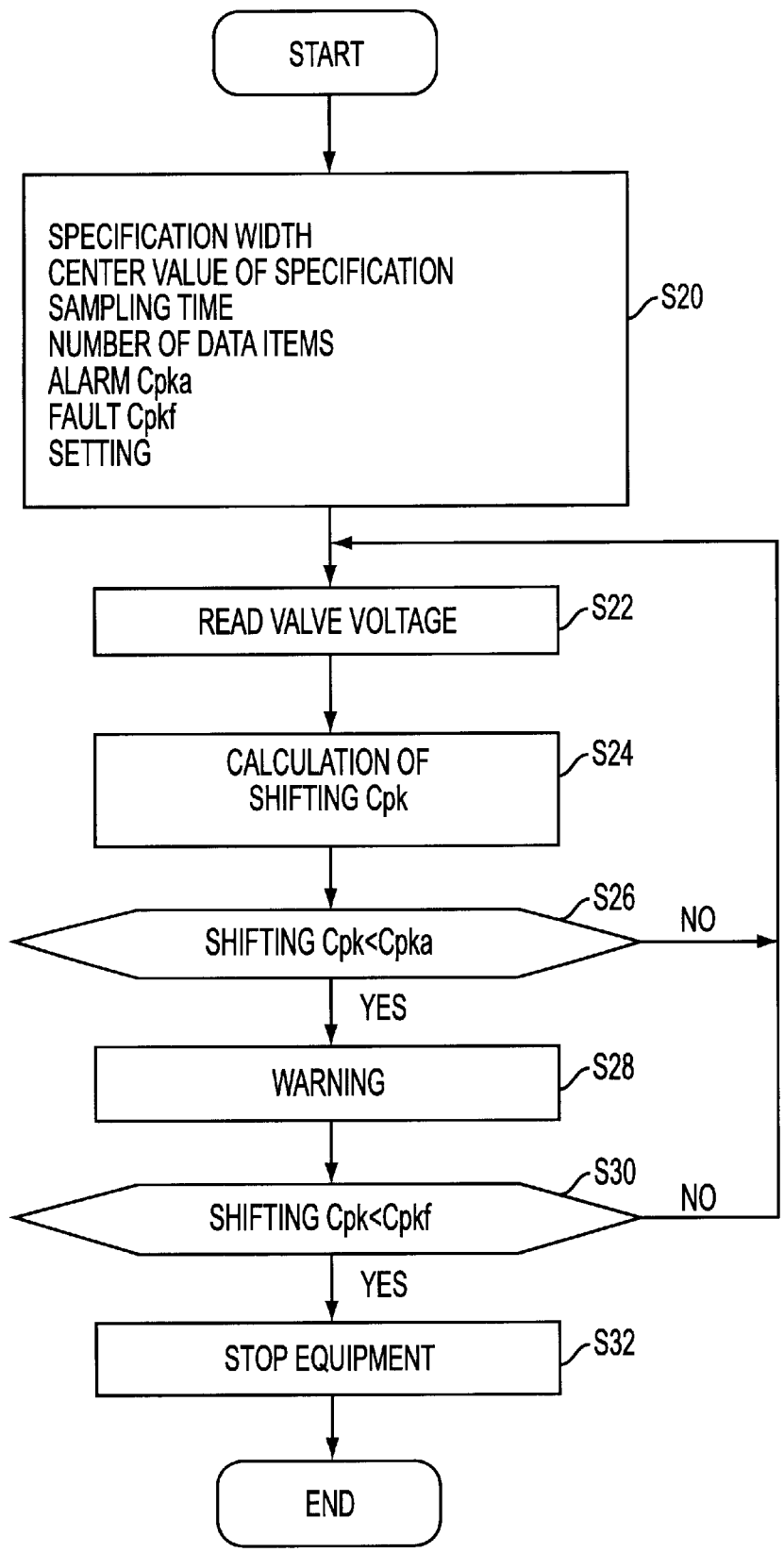
FIG. 5 is a flowchart illustrating a procedure of a process in the failure diagnostic apparatus.

The CPU 301 of the failure diagnostic apparatus 30 executes the failure diagnostic process in accordance with a procedure shown in FIG. 5.

Referring to FIG. 5, in step S20, the specification width, the center value of the specification, a sampling time, a predetermined number of data items used to calculate the shifting Cpk value, a reference value Cpka which is an alarm point and a reference value Cpkf (Cpka>Cpkf) which is a fault point are set. The above values are used in the equation (2). At every sampling time, in step S22, a valve voltage output from the mass flow controller 20 is read. The valve voltage may be read every time a trigger is input.

After this, if the number of valve voltages reaches the predetermined number initially set, the process proceeds from step S22 to step S24. In step S24, the shifting Cpk value Is calculated from the latest predetermined number of valve voltages in accordance with the equation (2). In step S26, it is determined whether the calculated shifting Cpk value is less than the reference value Cpka which is the alarm point. If the shifting Cpk value is not less than the reference value Cpka (Cpk≧Cpka), since the mass flow controller 20 does not fail, the process returns to step S22. If the shifting Cpk value is less than the reference value Cpka (Cpk<Cpka), since the mass flow controller has failed or is becoming failure, the process proceeds to step S28. In this step, an alarm signal is supplied to the mass flow controller 20 and a warning is issued.

After this, the process further proceeds to step S30, it is determined whether the shifting Cpk value is less than the reference value Cpkf which is the fault point. If the shifting Cpk value is not less than the reference value Cpkf (Cpk≧Cpkf), since the mass flow controller 20 is becoming failure but has not been failed, the process returns to step S22. If the shifting Cpk value is less than the reference value Cpkf (Cpk<Cpkf), since mass flow controller 20 has been failed, the process proceeds to step S32. In this step, the mass flow controller 20 is stopped.

Figure 6:
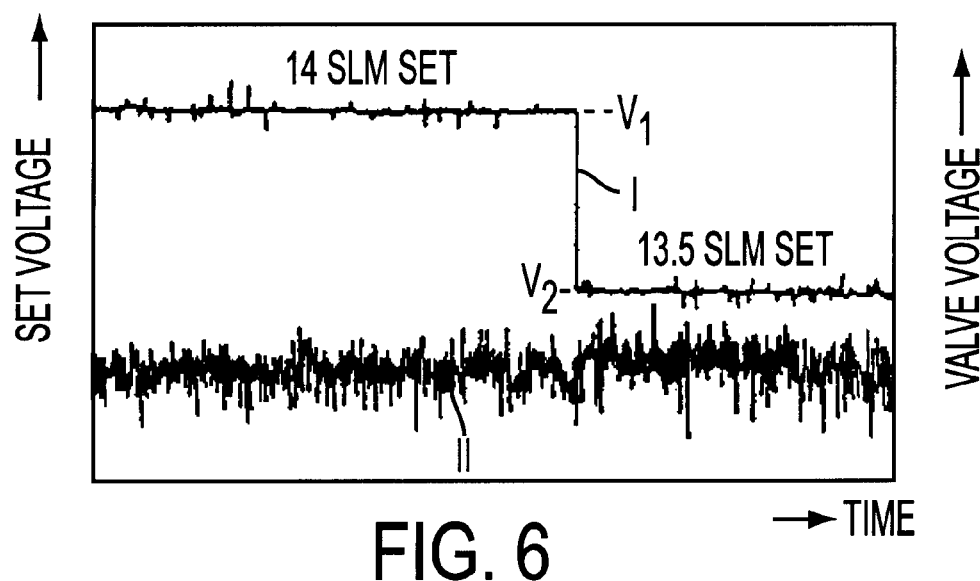
FIG. 6 is a diagram illustrating an example of variations of a set flow rate (a set voltage) in the mass flow controller and the valve voltage in accordance with time elapsing.
Figure 7:
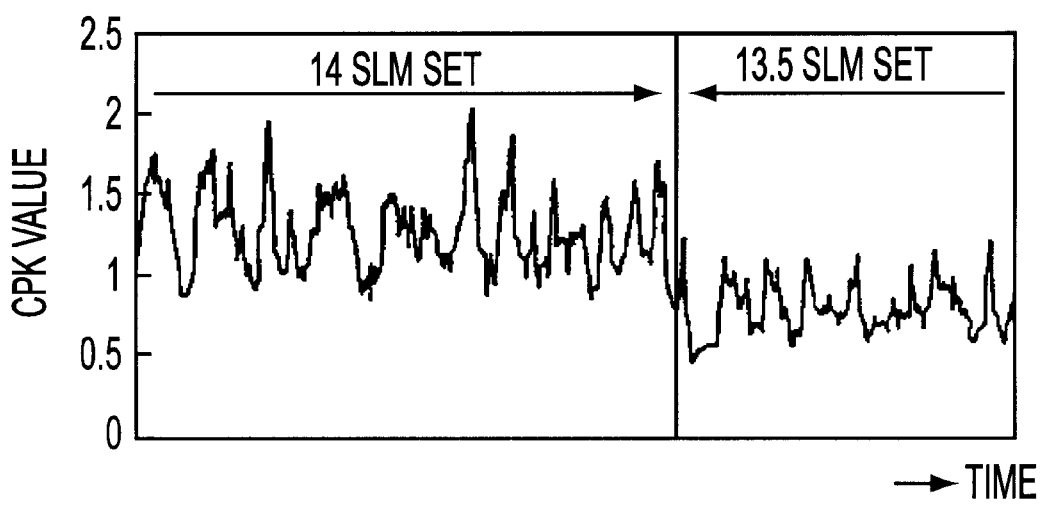
FIG. 7 is a diagram illustrating a relationship between the variation of the set flow rate (the set voltage) in the mass flow controller and the state of the value Cpk of the deviation process capability calculated from the valve voltages (1st)
Figure 8:
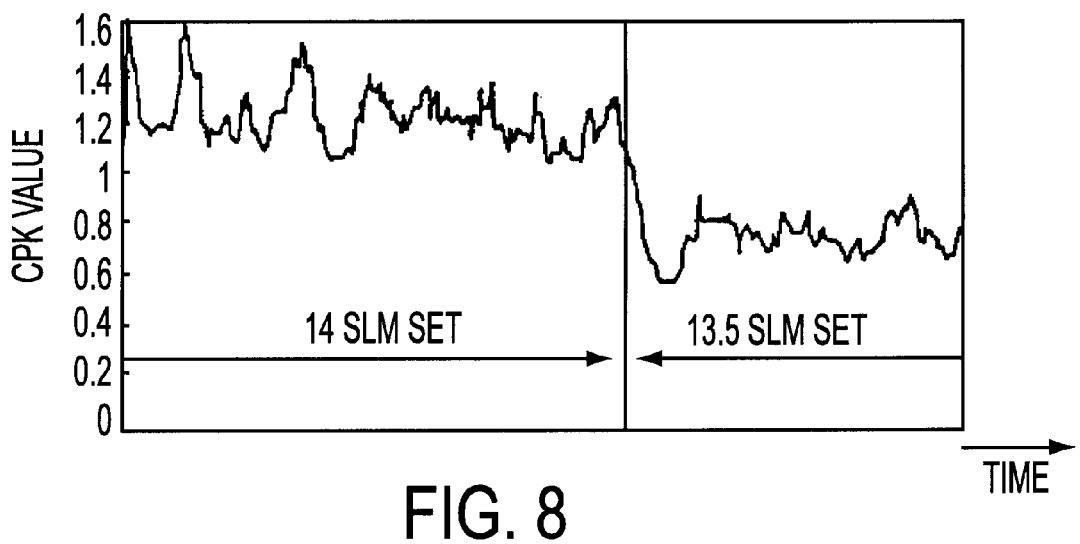
FIG. 8 is a diagram illustrating the relationship between the variation of the set flow rate (the set voltage) in the mass flow controller and the sate of the value Cpk of the deviation process capability calculated from the valve voltages (2nd)
Figure 9:
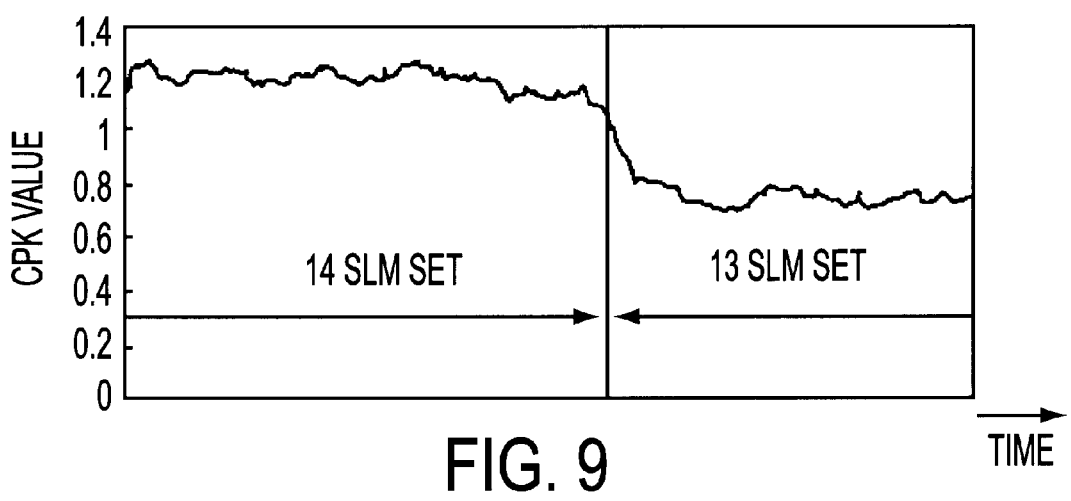
FIG. 9 is a diagram illustrating the relationship between the state of the value Cpk of the deviation process capability calculated from the valve voltages (3rd)

FIG. 6 shows the set voltage (the solid line I) and the valve voltage (the solid line II) in a case where the flow rate is changed from 14SLM to 13.5SLM assuming that the mass flow controller is virtually in bad condition. In this case, the shifting Cpk value obtained from valve voltages is shown in FIG. 7, FIG. 8 and FIG. 9. FIG. 7 shows the shifting Cpk value in a case where the predetermined number of data Items used to obtain the shifting Cpk value is set at 20. FIG. 8 shows the shifting Cpk value In a case the predetermined number of data items is set at 60. FIG. 9 shows the shifting Cpk value in a case the predetermined number of data times is set at 180.

In the case where the predetermined number of data items is set at 20, the variation of the shifting Cpk values is large as shown in FIG. 7. However, if the reference value Cpka which is the alarm point is set at about 0.7, it can be accurately detected that the flow rate is changed from 14SLM to 13.5SLM and a warning can be issued. In addition, in the case where the predetermined number of data items is set at 60, the variation of the shifting Cpk values is small as shown in FIG. 8. In this case, if the reference value Cpka which is the alarm point is set at about 0.8 and the reference value Cpkf which is the fault point is set at about 0.7, a warning can be accurately issued and the equipment can be stopped. In the case where the predetermined number of data items is set at 180, the variation of the shifting Cpk values is further small as shown in FIG. 9. In this case, if the reference value Cpka which is the alarm point is set at about 0.9 and the reference value Cpkf which is the fault point is set at about 0.8, a warning can be accurately issued and the equipment can be stopped.

As has been described above, products (semiconductor devices in this case) having a quality in the set range of the process capability can be manufactured.

An apparatus of the semiconductor manufacturing equipment is generally connected with a data logging system. The data logging system transmits digital data, such as the temperature, the pressure, the flow rate, the speed of revolution and the number of pulses, to the failure diagnostic apparatus 30 or a computer in the data logging system carries out the failure diagnostic process, the failure diagnostic for all apparatuses for which the data logging data system can log data can be performed.

Figure 10:
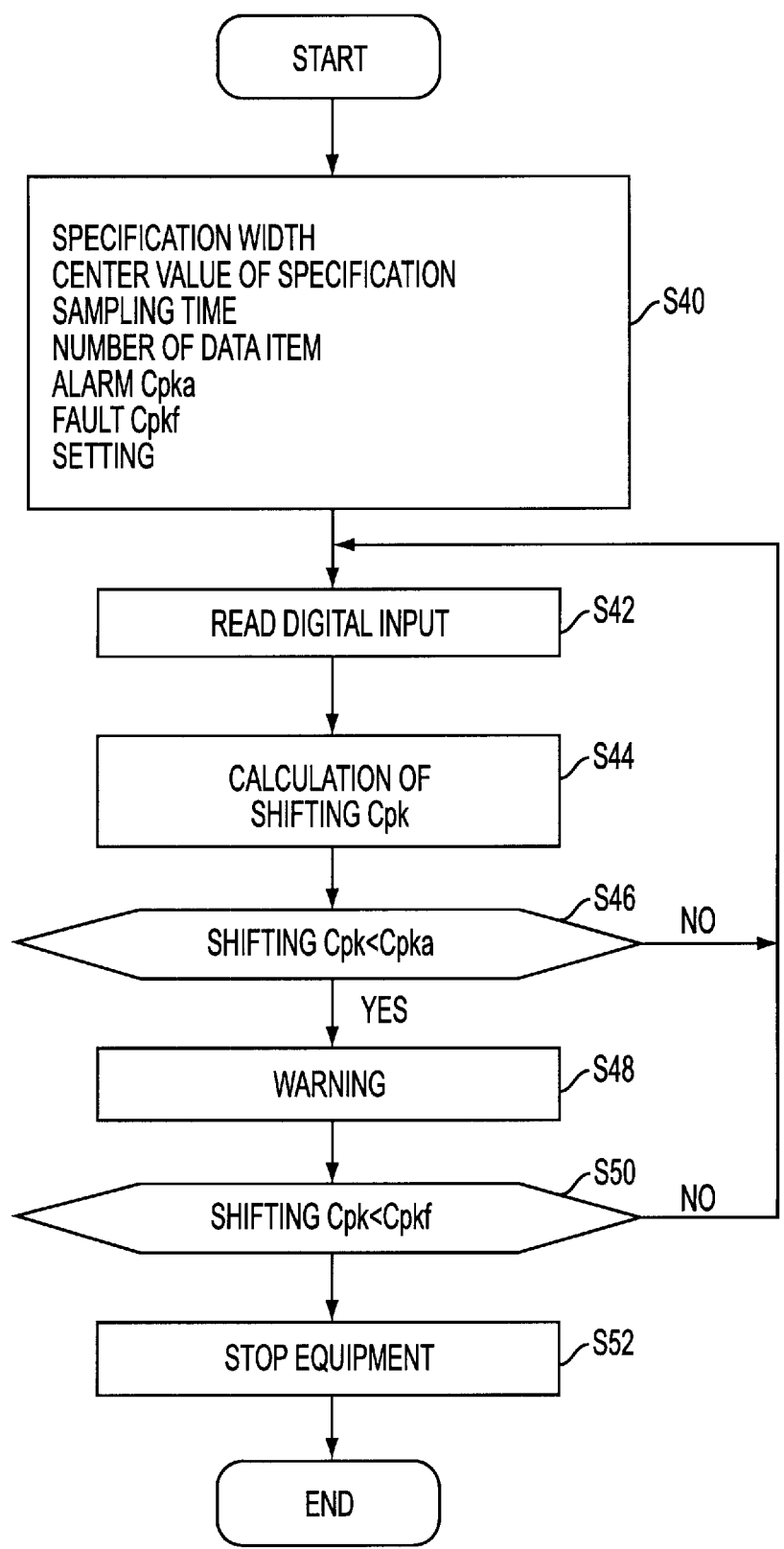
FIG. 10 is a flowchart illustrating another example of a procedure of a process in the failure diagnostic apparatus.

FIG. 10 shows a flowchart of a failure diagnostic process executed by the failure diagnostic apparatus 30 connected with the data logging system.

Referring to FIG. 10, in step S40, the specification width, the center value of the specification, the sampling time, the predetermined number of data items used to obtain the shifting Cpk value, the reference value Cpka which is the alarm point and the reference value Cpkf (Cpka>Cpkf) which is the fault point are set. At every set sampling time, in step S42, digital data supplied from the data logging sytem is read.

After this, when the number of digital data times reaches the set predetermined number, process proceeds from step S42 to step S44 and the shifting Cpk value is calculated from the latest predetermined number of digital data items in accordance with the equation (2). In step S46, it is determined whether calculated shifting Cpk value is less than the reference value Cpka which is the alarm point. If the calculated shifting Cpk value is not less than the reference value Cpka (Cpk≧Cpka), since an apparatus to be diagnosed does not fail, the process returns to step S42. If the calculated shifting Cpk is less than the reference value Cpka (Cpk<Cpka), since an apparatus to be diagnosed has failed or is becoming failure, the process proceeds to step S48. In this step, an alarm signal is supplied to the data logging system and a warning is issued.

After this, the process further proceeds to step S50, and it is determined whether the shifting Cpk value is less than the reference value Cpkf which is the fault point. If the shifting Cpk value is not less than the reference value Cpkf (Cpk≧Cpkf), since the equipment to be diagnosed is becoming failure but has not yet failed, the process returns to step S42. If the shifting Cpk value is less than the reference value Cpkf, since the equipment has failed, the process proceeds to step S52, and the equipment to be diagnosed is stopped.

Figure 11:
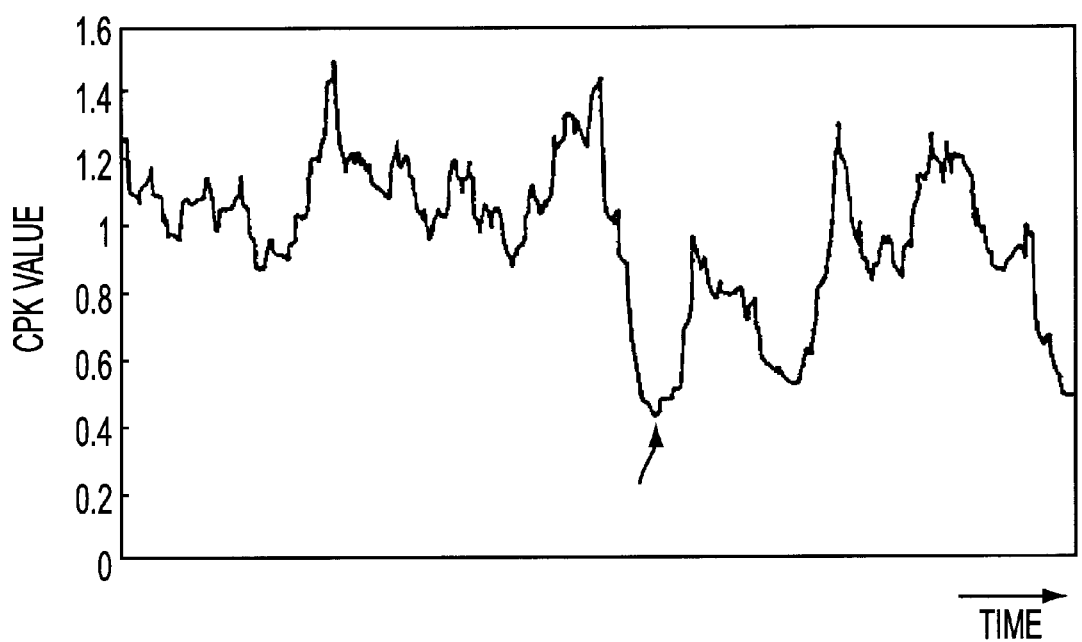
FIG. 11 is a diagram illustrating the variation of the value Cpk of the deviation process capability calculated from temperature data in the semiconductor manufacturing apparatus.

FIG. 11 shows the shifting Cpk value obtained by transmitting temperature data in a semiconductor manufacturing apparatus (an atmospheric pressure CVD apparatus) from the data logging system to the failure diagnostic apparatus 30. In this case, if the reference value Cpka which is the alarm point is set at about 0.8, it is recognized, at a time indicated by an arrow mark, that the equipment to be diagnosed is becoming failure and a warning can be issued.

In addition, there may be a case where apparatuses in a semiconductor factory are connected to a host computer by a communication system and various data items to the host computer In accordance with the SECS (Semiconductor Equipment Communication Standard). In such a case, the host computer carries out the failure diagnostic process shown in FIG. 10, so that it can be detected that each of the apparatuses in the factory has failed or is becoming failure. As a result, a semiconductor factory which can manufacture products having stable quality can be established.

Figure 12:
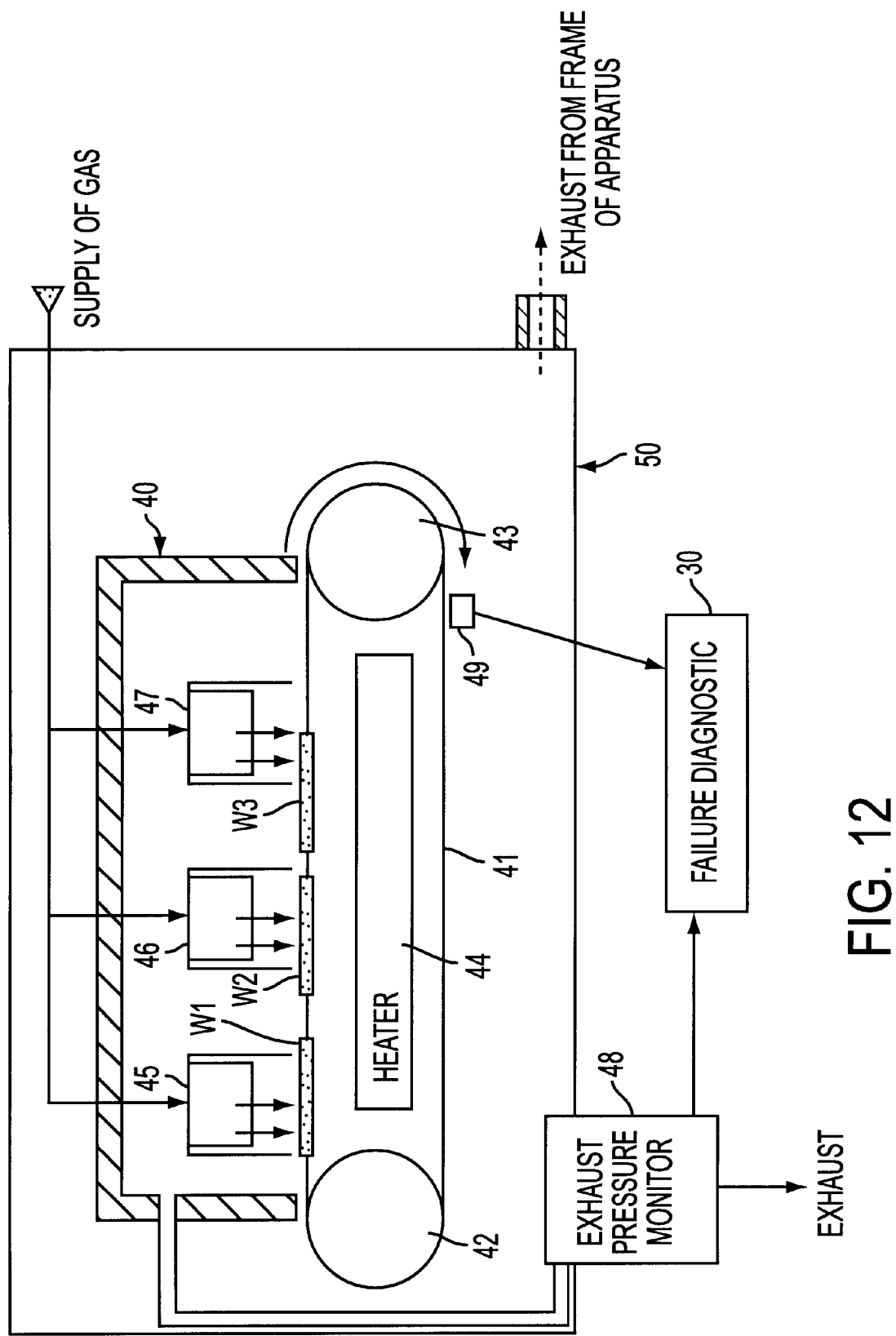
FIG. 12 is a diagram illustrating the failure diagnostic apparatus according to an embodiment of the present invention and an example of a basic constitution of a CVD apparatus to which the failure diagnostic apparatus is applied.

FIG. 12 shows an example of the constitution in a case where the failure diagnostic apparatus for equipment according to an embodiment of the present invention is applied to the CVD apparatus which is the semiconductor manufacturing apparatus.

Referring to FIG. 12, in a frame 50 of the CVD apparatus, a chamber 40, a belt 41 driven by rollers 42 and 43 and a heater 44 are mounted. The belt 41 is wound on the rollers 42 and 43 arranged at a predetermined interval so as to be moved at a constant speed by rotation of the rollers 42 and 43 at a constant speed. Wafers W1, W2 and W3 to which the CVD process is to be applied are set on the belt 41. The heater 44 is located in the belt 41 which is ring shaped between the rollers 42 and 43. The wafers W1, W2 and W3 set on the belt 41 are heated by the heater 44.

Injectors 45, 46 and 47 which eject the CVD reacting gas are mounted in the chamber 40. Gas ejecting holes of each of the injectors 45, 46 and 47 face the belt 41. The CVD reacting gas (silane, phosphine, diborane, oxygen or nitrogen) is supplied from the outside of the frame 50 through a pipe and ejected from the injectors 45, 46 and 47 located over the belt 41 to the wafer W1, W2 and W3 set on the belt 41. As a result, in the chamber 40, a silicon oxide film, a PSG film BPSG film or the like is formed on the surface of each of the wafers W1, W2 and W2 which are moved by the belt 41 at the constant speed in the reacting gas. In addition, the chamber 40 is exhausted of the reacting gas by an exhaust device to maintain the exhaust pressure at a constant value. An exhaust pressure monitoring apparatus 48 monitors the exhaust pressure.

The wafers W1, W2 and W3 are loaded on and unloaded from the belt 41 by a loader and an unloader which are not shown in figures. The loader and the unloader are located along the belt 41. Wafers which have not yet processed are loaded on the belt 41 by the loader located at the upstream side of the belt 41 in a moving direction. The wafer which has been processed (on which the film has been formed) are unloaded from the belt 41 by the unloader located at the downstream side of the belt 41 in the moving direction.

In the CVD apparatus as described above, if the moving speed of the wafers W1, W2 and W3, that is, the speed of the belt 41 is not constant, anything unusual, such as a situation in which a uniform film is not formed on each of the wafers, occurs, so that the yield is decreased. In addition, in a case where the exhaust pressure is not controlled at a constant value, the uniform film is not formed on each of the wafers.

Thus, in the frame 50, a speed sensor 49 used to detect the moving speed of the belt 41 is provided. Detecting signals from the speed sensor 49 are supplied to the failure diagnostic apparatus 30. In addition, detecting signals of the exhaust pressure detected by the exhaust pressure monitoring apparatus 48 are also supplied to the failure diagnostic apparatus 30. The failure diagnostic apparatus 30 determines, based on the speed v of the belt 41 and the exhaust pressure of the chamber 40, whether the CVD apparatus normally operates.

The failure diagnostic apparatus 30 is formed in the same manner as in the above case shown in FIG. 2. In this case, the interface unit 306 shown in FIG. 2 is connected to the exhaust pressure monitoring apparatus 48 and the speed sensor 49 shown in FIG. 12.

Figure 13:
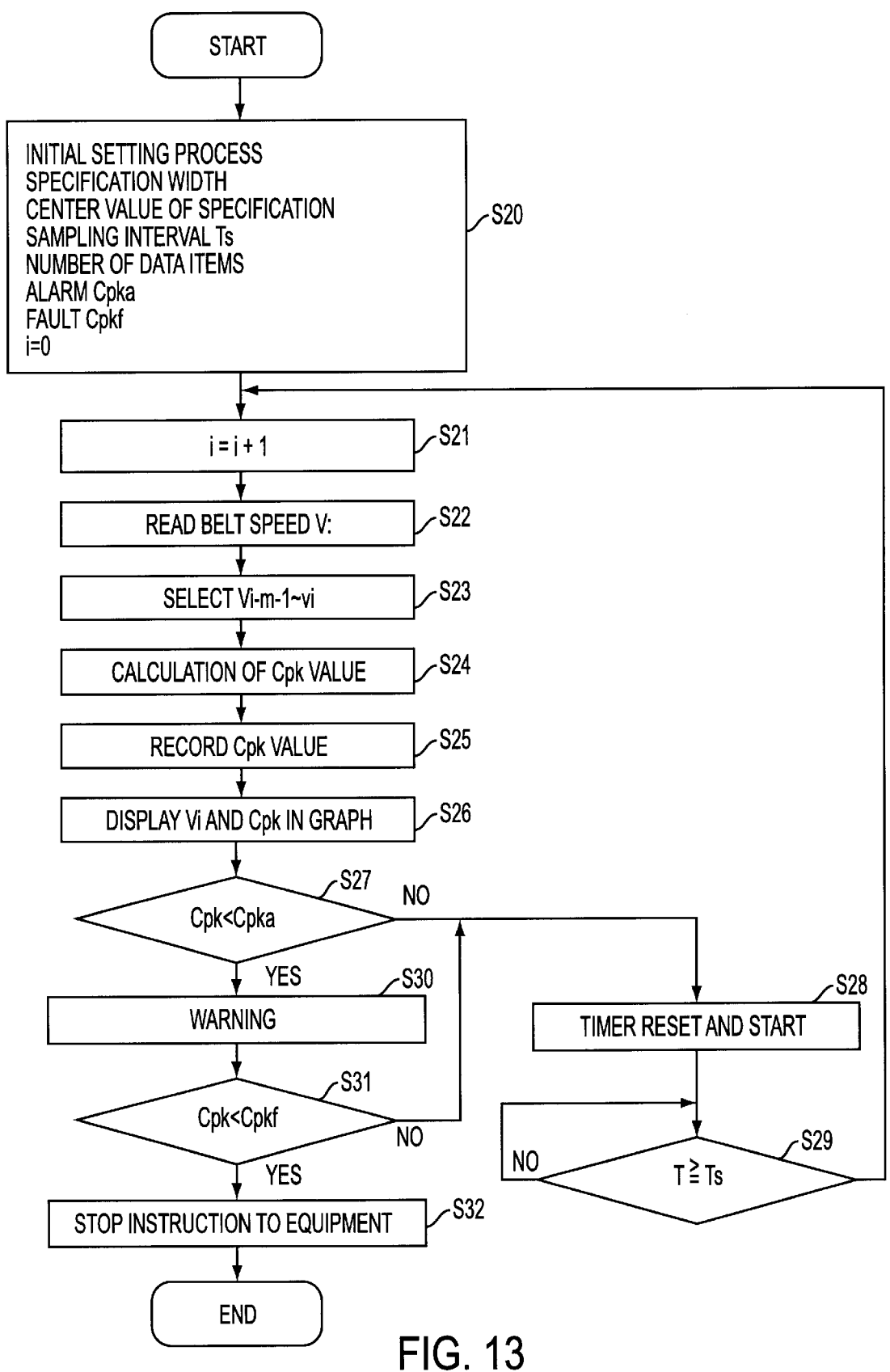
FIG. 13 is a flowchart illustrating a procedure of a process in the failure diagnostic apparatus shown in FIG. 12.

The CPU 301 of the failure diagnostic apparatus 30 carries out the failure diagnostic process based on the speed v of the belt 41 in accordance with a procedure shown in FIG. 13.

Referring to FIG. 13, an initial setting process is preformed (S20). In the initial setting process, various data values input by a user using the input unit 305 are set in internal registers. To be concrete, the specification width and center of the specification of belt speeds in the normal state, the sampling interval (time) Ts of the belt speed, the number m of sampled belt speeds required to obtain the shifting Cpk value in accordance with the equation (2), an alarm point value Cpka which is a threshold used to issue a warning, a fault point value Cpkf which is the threshold used to stop the CVD apparatus and the initial value of an internal counter i (i=1) are set.

After the initial setting process is completed, the internal counter is incremented by +1 (S21), and the belt speed $v_i$ based on the detecting signal from the speed sensor 49 is read (S22). The belt speed $v_i$ is stored in the memory unit 302. From among the belt speeds vi which have been stored in the memory unit 302, the latest m data items, that is, the belt speeds $v_{i-m-1}$–$v_i$ are read (S23).

With respect to the m belt speeds $v_{i-m-1}$–$v_i$, the shifting Cpk value is then calculated in accordance with the equation (2) (S24). The calculated shifting Cpk value is stored in the memory unit 302 (S25). The sampled belt speed data $v_i$ and the calculated shifting Cpk value are successively stored in the memory unit 302, so that the history of the belt speed $v_i$ and the shifting Cpk value is formed in the memory unit 302.

After this, the sampled belt speed $v_i$ and the calculated shifting Cpk value are transmitted to the display unit 304 and the belt speed vi and the shifting Cpk value are plotted in a graph on the screen of the display unit 304. It is then determined whether the calculated shifting Cpk value is less than the alarm point value Cpka (Cpk<Cpka)(S27). If the calculated shifting Cpk value is not less than the alarm point value Cpka, the timer is reset and started (S28). After this, it is determined whether the timer value T reaches the sampling interval (time) Ts (S29). If the timer value T reaches the sampling interval (time) Ts, the internal counter is incremented by +1 (S21) and the same process described above is executed.

If the shifting Cpk value is equal to or greater than the alarm point value Cpka, the above process (S21–S29) is repeatedly performed. During the process, the sampled belt speed $v_i$ and the shifting Cpk value calculated with respect to the latest m sampled belt speeds $v_{i-m-1}$–$v_i$ are plotted in the graph on the screen of the display unit 304. As a result, the belt speed $v_i$ which is varied with time elapsing as shown by a solid line I in FIG. 14 and the shifting Cpk value which is varied with time elapsing as shown by a solid line II in FIG. 14 are displayed on the screen of the display unit 304.

Figure 14:
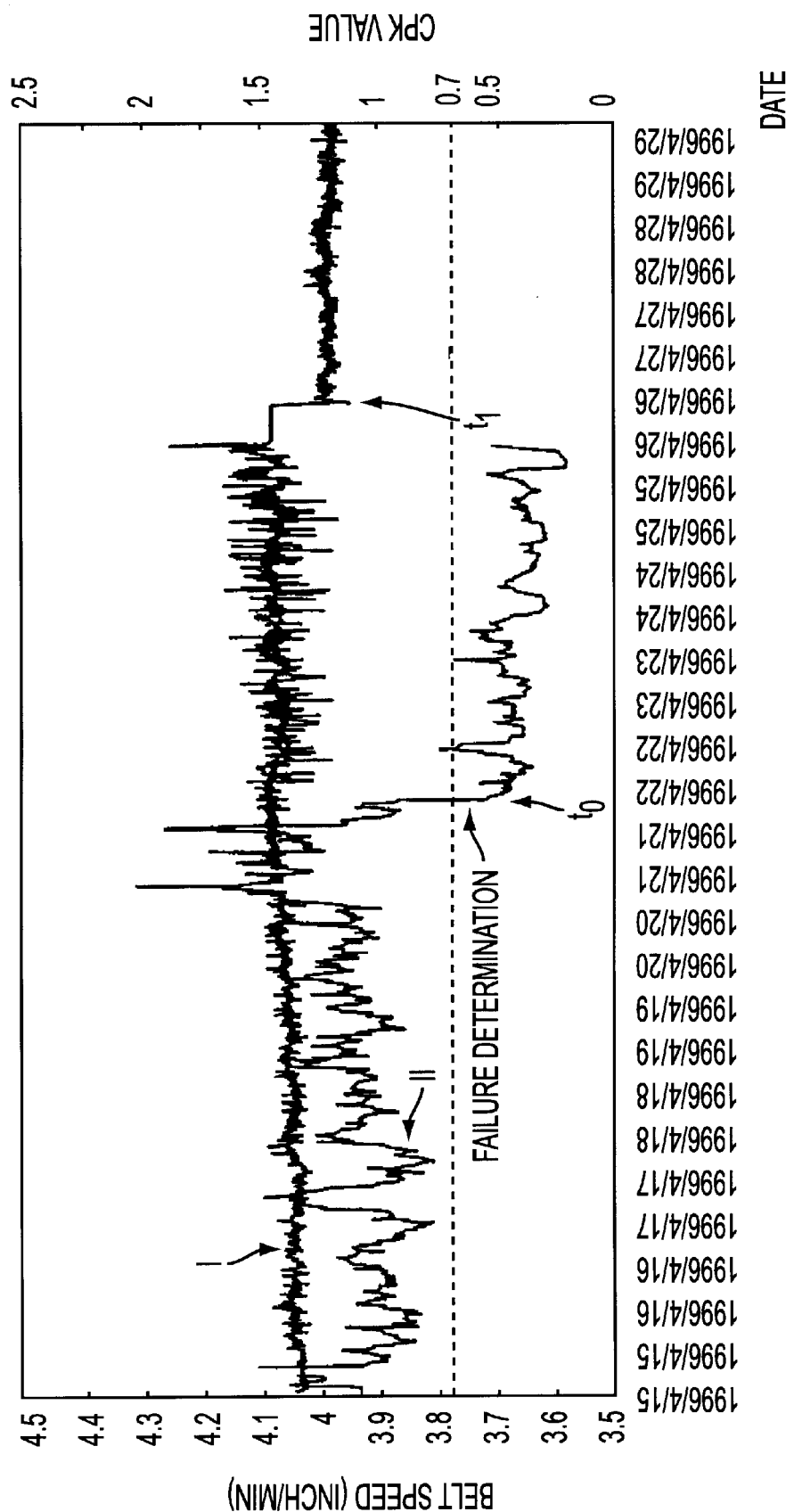
FIG. 14 is a diagram illustrating the variation of a speed of a belt in the CVD apparatus shown in FIG. 11 the state of the value Cpk of the deviation process capability calculated from the speed of the belt.

In the above process, if the calculated shifting Cpk value is less than the alarm point value Cpka (e.g., 0.7), a warning message is supplied from the CPU 301 to the display unit 302 (S30), the warning message (e.g., "PLEASE CHANGE BELT") is displayed on the screen of the display unit 302 along with the graph of the belt speed $v_i$ and shifting Cpk value (see FIG. 14). It is then determined whether the shifting Cpk value is less than the fault point value Cpkf (Cpk<Cpkf) (S21).

If the shifting Cpk value is equal to or greater than the fault point value Cpkf, the measurement process of the sampling interval Ts (S28 and S29) and the process (S21–S27, S30 and S31) described above are repeatedly performed. As a result, on the screen of the display unit 304, the warning message is continuously displayed and the graph of the belt speed $v_i$ and the shifting Cpk value are displayed (see the solid lines I and II in FIG. 14). In the case shown in FIG. 14, on a date t0, the shifting Cpk value becomes less than the alarm point value Cpka. After this, while the shifting Cpk value is being varied in a range between the alarm point value Cpka and the fault point value Cpkf, the display as described above is formed on the display unit 302.

In the above process, if the shifting Cpk value is less than the fault point value Cpkf, the CPU 301 outputs stop instruction information (S32). The stop instruction information is transmitted to the CVD apparatus via the interface unit 306. The CVD apparatus which receives the stop instruction information stops operations (driving the belt, supplying the reacting gas and the like) in accordance with the instruction. After outputting the stop instruction information, the CPU 301 terminates the failure diagnostic process.

In the case shown in FIG. 14, on a date t1, the CVD apparatus is stopped because of a failure of the belt 41. On a date t0 before the date t1, when the shifting Cpk value becomes less than the alarm point value Cpka (e.g., 0.7) the user can recognize a sign of the failure based on the warning message displayed on the screen of the display unit 304.

In addition, in the above embodiment, when the shifting Cpk value becomes less than the alarm point value Cpka, the warning message is displayed by the display unit 304 so that the user is informed of a state where the apparatus is becoming failure. However, by only displaying the shifting Cpk value which is varied as shown by the solid line II in FIG. 14 on the screen of the display unit 304, the user can also recognize the state regarding the failure of the apparatus based on the variation of the shifting Cpk value.

In addition, the failure diagnostic process for the CVD apparatus is performed, based on the exhaust pressure of the chamber 40 of the CVD apparatus, in accordance with the same procedure shown in FIG. 13. As a result, on the screen of the display unit 304, the exhaust pressure which is varied with time elapsing as shown by a solid line I in FIG. 15 and the shifting Cpk value, calculated with resect to m exhaust pressure data items, which is varied with time elapsing as shown by a solid line II in FIG. 15 are displayed.

When the shifting Cpk value is less than the alarm point value Cpka (e.g., 0.7), the warning message is displayed by the display unit 304. If the shifting Cpk value is further less than the fault point value Cpkf, the CVD apparatus is stopped.

Figure 15:
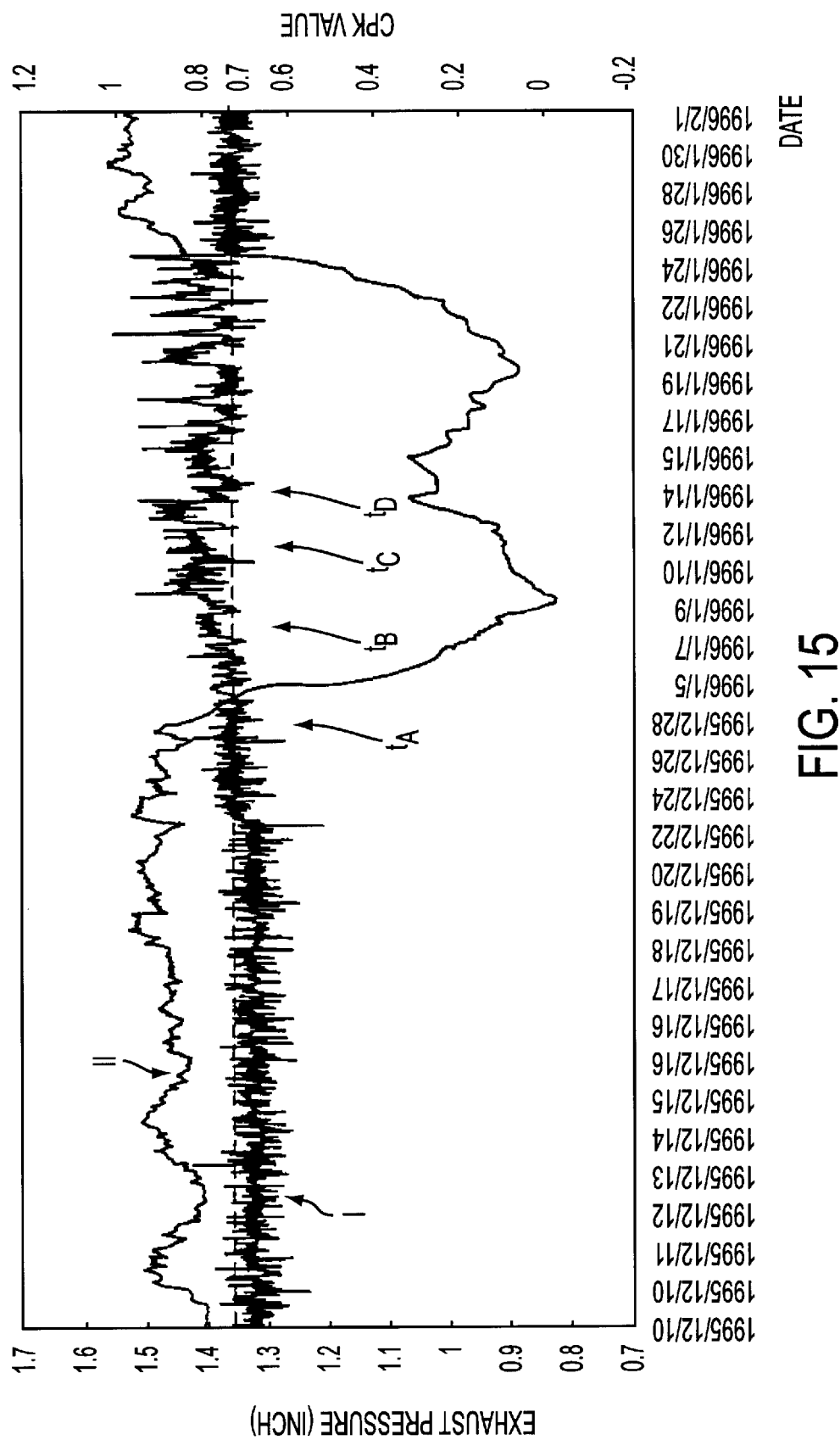
FIG. 15 is a diagram illustrating the variation of an exhaust pressure in the CVD apparatus shown in FIG. 11 and the state of the value Cpk of the deviation process capability calculated from the exhaust pressure.

In the example shown in FIG. 15, on dates $t_A$, $t_B$, $t_C$ and $t_D$, the density of boron (B) in a film formed on the surface of each of the wafers was unusual. Thus, if the alarm point value Cpka is set at a value within a rage between 0.7 and 0.8, the failure of the apparatus can be recognized due to the warning message.

In the above embodiments, the failure diagnostic for the semiconductor manufacturing apparatus is carried out based on the gas flow rate, the belt speed and the exhaust pressure. However, the present invention is not limited to these aspects. Based on parameters generally representing operating states of the equipment, the failure diagnostic for the equipment can be performed in accordance with the same manner as in the above embodiments.

In addition, the current and the voltage supplied to a vacuum pump motor, a wafer changing motor a stage motor, a belt driving motor and a CMP driving motor used in the semiconductor manufacturing equipment, such as a low pressure CVD apparatus, a atmospheric pressure CVD apparatus, a diffusion apparatus, an exposure apparatus, a sputter apparatus, an I I apparatus, an etching apparatus, a testing apparatus, a pre-processing apparatus, a CMP apparatus and a coat/development apparatus, are used as the operating state parameters used to calculate the value of the deviation process capability (the Cpk value). The vibration (converted into a voltage value) of a wafer holding block and a pump used in the semiconductor manufacturing equipment may also be used as the operating state parameter to calculate the deviation process capability (the Cpk value).

Further, the temperature (converted in to a voltage value), the automatic controlled pressure (a voltage value) and the MFC value (a voltage value) in a heating furnace used in some of above semiconductor manufacturing apparatuses may be used as the value of the deviation process capability (the Cpk value). In addition, data, such as the film thickness, the refractive index, the density, the number of defects, the number of particles, the line width and the positioning accuracy, measured by various measuring instruments, used to manufacture semiconductor devices, such as the film thickness measuring instrument, the thermometer, a length measuring instrument and the density measuring instrument, may be used as the operating state parameters. The RF value in the CVD apparatus, the sputter apparatus and the etching apparatus is also used as the operating state parameter.

The parameters of the film thickness, the refractive index, the number of defects and the like represent the state of the product, but do not directly represent the operating state of the manufacturing equipment. However, since the quality of the product depends on the operating state of the manufacturing equipment, the parameters representing the state of the product indirectly represent the operating state of the manufacturing equipment, and can be regarded as the operating state parameters in the present invention.

In addition, in the respective embodiments, the equipment (the semiconductor manufacturing equipment) and the failure diagnostic apparatus are separated from each other. However, a function of the failure diagnostic apparatus may be included in the equipment.

As has been described above, according to the present invention, every time the predetermined number of operating state parameters are selected, the value of the deviation process capability is calculated from the operating state parameters and the state regarding the failure of the equipment is determined based on the value of the deviation process capability. Thus, it can be accurately determined, based on the operating state of the equipment whether the equipment has failed or whether the equipment is becoming failure.

The present invention is not limited to the aforementioned embodiments, and other variations and modifications may be made without departing from the scope of the claimed invention.

What is claimed is:

1. A failure diagnostic method for diagnosing a failure of equipment based on an operating state of the equipment, the method comprising:

obtaining operating state parameters, in time series, which represent the operating state of the equipment;

selecting a predetermined number of operating state parameters from among the obtained operating state parameters;

calculating a value of a deviation process capability from the predetermined number of operating state parameters every time the predetermined number of operating state parameters are selected; and determining a state regarding a failure of the equipment based on the value of the deviation process capability.

2. The failure diagnostic method as claimed in claim 1, wherein the predetermined number of operating state parameters which are successive in time series are shifted on a time scale and selected from among the obtained operating state parameters.

3. The failure diagnostic method as claimed in claim 2, wherein every time an operating state parameter of the equipment is obtained, the latest predetermined number of operating state parameters including the obtained operating state parameter are selected.

4. A failure diagnostic apparatus for diagnosing a failure of equipment based on an operating state of the equipment, comprising:

a parameter obtaining unit to obtain operating state parameters, in time series, which represent the operating state of the equipment;

a parameter selecting unit to select a predetermined number of operating state parameters from among the obtained operating state parameters;

a calculating unit to calculate a value of a deviation process capability from the predetermined number of operating state parameters every time the predetermined number of operating state parameters are selected;

a determining unit to determine a state regarding a failure of the equipment based on the value of the deviation process capability; and an output unit to output information based on a determination result obtained by the determining unit.

5. The failure diagnostic apparatus as claimed in claim 4, wherein the parameter selecting unit comprises a shifting unit to shift on a time scale the predetermined number of operating state parameters which are successive in time series and selecting the predetermined number of operating state parameters.

6. The failure diagnostic apparatus as claimed in claim 5, wherein the shifting unit to shift and select the predetermined number of operating state parameters comprises a selecting unit, every time an operating state parameter is obtained, to select the latest predetermined number of operating state parameters including the obtained operating state parameter.

7. The failure diagnostic apparatus as claimed in claim 4, wherein the determining unit comprises a comparing unit to compare the value of the deviation process capability with a predetermined reference value, and wherein the determination regarding the failure of the equipment is performed based on a comparison result.

8. The failure diagnostic apparatus as claimed in claim 4, wherein the calculated value output unit to output the value of the deviation process capability is substituted for the determining unit and the output unit.

9. A failure diagnostic apparatus for diagnosing a failure of equipment based on an operating state of the equipment, comprising:

a parameter obtaining unit to obtain operating state parameters, in time series, which represent the operating state of the equipment;

a parameter selecting unit to select a predetermined number of operating state parameters from among the obtained operating state parameters;

a calculating unit to calculate a value of a deviation process capability from the predetermined number of operating state parameters every time the predetermined number of operating state parameters are selected;

a generating unit to generate information regarding a failure state of the equipment based on the value of the deviation process capability calculated by the calculating unit; and an output unit to output the generated information regarding the failure state of the equipment.

10. The failure diagnostic apparatus as claimed in claim 9, wherein the generating unit to generate the information regarding the failure state of the equipment comprises a unit to generate a history of values of the deviation process capability as the information regarding the failure state of the equipment.

11. The failure diagnostic apparatus as claimed in claim 9, wherein the parameter selecting unit comprises a shifting unit to shift on a time scale the predetermined number of operating state parameters which are successive in time series and selecting the predetermined number of operating state parameters.

12. A recording medium storing a program causing a computer to execute a process for diagnosing a failure of equipment based on an operating state of the equipment, the program comprising:

obtaining operating state parameters, in time series, which represent the operating state of the equipment;

selecting a predetermined number of operating state parameters from among the obtained operating state parameters;

calculating a value of a deviation process capability from the predetermined number of operating state parameters every time the predetermined number of operating state parameters are selected; and determining a state regarding a failure of the equipment based on the value of the deviation process capability.

13. A recording medium storing a program causing a computer to execute a process for diagnosing a failure of equipment based on an operating state of the equipment, the program comprising:

obtaining operating state parameters, in time series, which represent the operating sate of the equipment;

selecting a predetermined number of operating state parameters from among the obtained operating state parameters;

calculating a value of a deviation process capability from the predetermined number of operating state parameters every time the predetermined number of operating state parameters are selected; and generating information regarding a failure state of the equipment based on the value of the deviation process.

14. A semiconductor manufacturing apparatus having a failure diagnostic function for diagnosing a failure based on an operating state, comprising:

a parameter obtaining unit to obtain operating state parameters, in time series, which represent the operating state of the semiconductor manufacturing apparatus;

a parameter selecting unit to select a predetermined number of operating state parameters from among the obtained operating state parameters;

a calculating unit to calculate a value of a deviation process capability from the predetermined number of operating state parameters every time the predetermined number of operating state parameters are selected;

a determining unit to determine a state regarding a failure of the semiconductor manufacturing apparatus based on the value of the deviation process capability; and an output unit to output information based on a determination result obtained by the determining unit.

15. A semiconductor manufacturing apparatus having a failure diagnostic function for diagnosing a failure based on an operating state, comprising:

a parameter obtaining unit to obtain operating state parameters, in time series, which represent the operating state of the semiconductor manufacturing apparatus;

a parameter selecting unit to select a predetermined number of operating state parameters from among the obtained operating state parameters;

a calculating unit to calculate a value of a deviation process capability from the predetermined number of operating state parameters every time the predetermined number of operating state parameters are selected;

a generating unit to generate information regarding a failure state of the semiconductor manufacturing apparatus based on the value of the deviation process capability calculated by the calculating means; and an output unit to output the generated information regarding the failure state of the semiconductor manufacturing apparatus.

16. A failure diagnostic apparatus for diagnosing a failure of equipment based on an operating state of the equipment, comprising:

parameter obtaining means for obtaining operating state parameters, in time series, which represent the operating state of the equipment;

parameter selecting means for selecting a predetermined number of operating state parameters from among the obtained operating state parameters;

calculating means for calculating a value of a deviation process capability from the predetermined number of operating state parameters every time the predetermined number of operating state parameters are selected;

determining means for determining a state regarding a failure of the equipment based on the value of the deviation process capability; and output means for outputting information based on a determination result obtained by the determining means.

17. A failure diagnostic apparatus for diagnosing a failure of equipment based on an operating state of the equipment, comprising:

parameter obtaining means for obtaining operating state parameters, in time series, which represent the operating state of the equipment;

parameter selecting means for selecting a predetermined number of operating state parameters from among the obtaining operating state parameters;

calculating means for calculating a value of a deviation process capability from the predetermined number of operating state parameters every time the predetermined number of operating state parameters are selected;

generating means for generating information regarding a failure state of the equipment based on the value of the deviation process capability calculated by the calculating means; and output means for outputting the generated information regarding the failure state of the equipment.

18. The failure diagnostic apparatus as claimed in claim 17, wherein said means for shifting and selecting the predetermined number of operating state parameters comprises means for, every time an operating state parameter is obtained, selecting the latest predetermined number of operating state parameters including the obtained operating state parameter.

19. The failure diagnostic apparatus as claimed in claim 16, wherein the determining means comprises comparing means for comparing the value of the deviation process capability with a predetermined reference value, and wherein the determination regarding the failure of the equipment is performed based on a comparison result.

20. The failure diagnostic apparatus as claimed in claim 16, wherein the calculated value output means for outputting the value of the deviation process capability is substituted for the determining means and the output means.

21. A failure diagnostic apparatus for diagnosing a failure of equipment based on an operating state of the equipment, comprising:

parameter obtaining means for obtaining operating state parameters, in time series, which represent the operating state of the equipment;

parameter selecting means for selecting a predetermined number of operating state parameters from among the obtained operating state parameters;

calculating means for calculating a value of a deviation process capability from the predetermined number of operating state parameters every time the predetermined number of operating state parameters are selected;

generating means for generating information regarding a failure state of the equipment based on the value of the deviation process capability calculated by the calculating means; and output means for outputting the generated information regarding the failure state of the equipment.

22. The failure diagnostic apparatus as claimed in claim 21, wherein the means for generating the information regarding the failure state of the equipment comprises means for generating a history of values of the deviation process capability as the information regarding the failure state of the equipment.

23. The failure diagnostic apparatus as claimed in claim 21, wherein the parameter selecting means comprises shifting means for shifting on a time scale the predetermined number of operating state parameters which are successive in time series and selecting the predetermined number of operating state parameters.

24. A semiconductor manufacturing apparatus having a failure diagnostic function for diagnosing a failure based on an operating state, comprising:

parameter obtaining means for obtaining operating state parameters, in time series, which represent the operating state of the semiconductor manufacturing apparatus;

parameter selecting means for selecting a predetermined number of operating state parameters from among the obtained operating state parameters;

calculating means for calculating a value of a deviation process capability from the predetermined number of operating state parameters every time the predetermined number of operating state parameters are selected;

determining means for determining a state regarding a failure of the semiconductor manufacturing apparatus based on the value of the deviation process capability; and output means for outputting information based on a determination result obtained by the determining means.

25. A semiconductor manufacturing apparatus having a failure diagnostic function for diagnosing a failure based on an operating state, comprising:

parameter obtaining means for obtaining operating state parameters, in time series, which represent the operating state of the semiconductor manufacturing apparatus;

parameter selecting means for selecting a predetermined number of operating state parameters from among the obtained operating state parameters;

calculating means for calculating a value of a deviation process capability from the predetermined number of operating state parameters every time the predetermined number of operating state parameters are selected;

generating means for generating information regarding a failure state of the semiconductor manufacturing apparatus based on the value of the deviation process capability calculated by the calculating means; and output means for outputting the generated information regarding the failure state of the semiconductor manufacturing apparatus.

* * * * *